United States Patent [19]

Steeves

[11] Patent Number: 4,921,361
[45] Date of Patent: May 1, 1990

[54] CARRIER IN GUIDE TRACK PRODUCT MOVING SYSTEM

[75] Inventor: Christopher Steeves, Toronto, Canada

[73] Assignee: Balltrax Inc., Toronto, Ontario, Canada

[21] Appl. No.: 329,191

[22] Filed: Mar. 27, 1989

[51] Int. Cl.$^5$ .............................................. F16C 29/06
[52] U.S. Cl. ...................................................... 384/45
[58] Field of Search .............................. 384/45, 43, 44; 464/168

[56] References Cited

U.S. PATENT DOCUMENTS

| | | | |
|---|---|---|---|
| 4,030,191 | 6/1977 | Ernst et al. | 384/45 |
| 4,478,462 | 10/1984 | Teramachi | 384/45 |
| 4,769,565 | 9/1988 | Teramachi | 384/45 |
| 4,778,284 | 10/1988 | Teramachi | 384/45 |

*Primary Examiner*—Lenard A. Footland

[57] ABSTRACT

The present invention provides a product moving set up comprising a guide member and a carrier member movable along the guide member. A ball race is provided to either side of the set up and each ball race is fitted with rolling balls which recirculate through the ball race as the carrier member moves along the guide member. Each ball race is formed by cooperative race portions on the guide member and the carrier member with the cooperative race portions comprising a pair of back to back first race portions on the carrier member and a pair of second race portions on the interior of the guide member and facing the first race portions. The first and second race portions on each side of the set up are all in vertical alignment with one another.

6 Claims, 5 Drawing Sheets

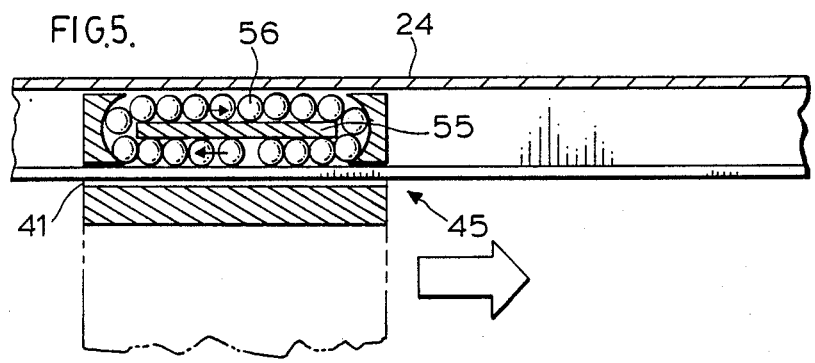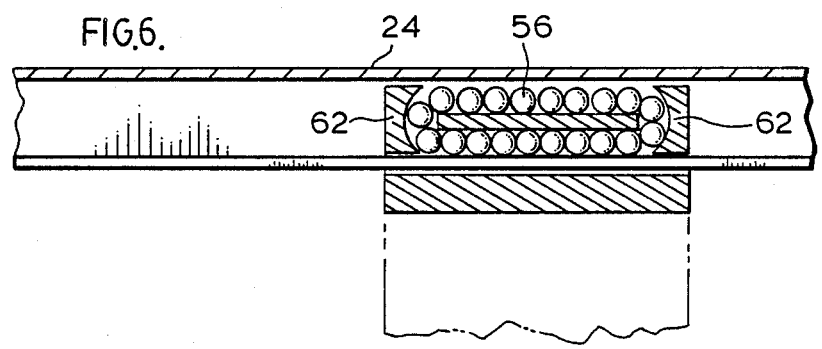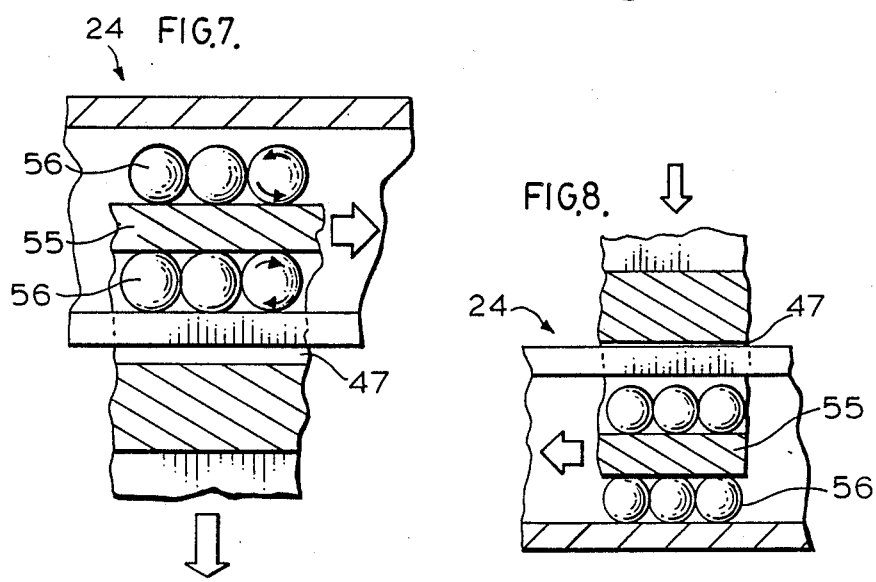

CARRIER IN GUIDE TRACK PRODUCT MOVING SYSTEM

FIELD OF THE INVENTION

The present invention relates to a product moving system including a guide member and a carrier member movable along the guide member through the use of recirculating balls trapped within ball races of the system.

BACKGROUND OF THE INVENTION

Carrier systems, including a guide track and a carrier member movable along a guide track are particularly useful for moving product over an extended distance. Furthermore, the use of recirculating balls in a carrier system is very effective for load bearing purposes.

There are a number of prior art arrangements including a carrier movable through recirculating balls along a guide. By way of example, U.S. Pat. No. 4,648,726 shows a carrier movable along a guide member using recirculating balls. However, the raceway for the balls extends in a horizontal direction so that the balls themselves not only bear the load but additionally provides the sole means of support between the carrier member and the guide.

U.S. Pat. No. 4,527,840 issued July 9, 1985 to Mugglestone also describes a carrier system where the balls recirculate in a horizontal fashion. Furthermore, in the Mugglestone arrangement the balls are totally enclosed within the carrier member which therefore includes a complicated structure to ride along the guide rail.

U.S. Pat. Nos. 4,420,193 dated Dec. 13, 1983, 4,549,770 dated Oct. 29, 1985 and 4,692,039 dated Sept. 8, 1987 and all issued to Teramachi describe different forms of carrier systems including a guide rail and carrier member or bearing which moves along the guide rail. Once again, each of these structures is relatively complicated and specifically requires the use of a double set of recirculating balls at each side of the set up. In addition none of the balls in each set recirculate in a vertical fashion again placing them in an awkward load bearing position. Furthermore, the carrier member itself in each of these patented structures is provided with a relatively inaccessible completely closed channel for recirculation of the balls.

SUMMARY OF THE PRESENT INVENTION

The present invention provides a product moving system which is extremely simple while being very efficient in comparison to prior art set ups. In particular, the product moving system of the present invention comprises a guide member and a carrier member movable along the guide member. The system includes at least one ball race to either side thereof and may include more than one ball race, although only one is necessary. Each ball race is fitted with rolling balls which recirculate through the ball race as the carrier member moves along the guide member. Each of the ball races is formed by cooperative race portions on the guide member and the carrier member. These cooperative race portions comprise a pair of back to back first race portions on the carrier member and a pair of second race portions on the guide member facing the first race portions. The first and second race portions on each side of the system are in vertical alignment with one another which is particularly efficient for load bearing purposes.

BRIEF DESCRIPTION OF THE DRAWINGS

The above as well as other advantages and features of the present invention will be described in greater detail according to the preferred embodiments of the present invention in which;

FIGS. 5 and 6 are sectional views showing movement of the carrier relative to the guide track according to either one of the systems shown in FIG. 1 or 2.

FIG. 7 is an enlarged sectional view through the carrier member shown in FIGS. 5 and 6.

FIG. 8 is an enlarged sectional view through a carrier member used in the system of FIG. 3.

DETAILED DESCRIPTION ACCORDING TO THE PREFERRED EMBODIMENTS OF THE PRESENT INVENTION

Figure 1:
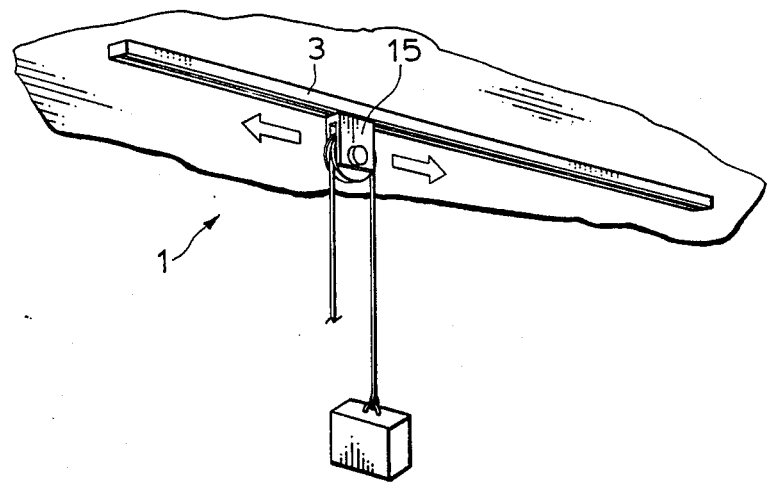
FIG. 1 is a perspective view of a product moving system according to a preferred embodiment of the present invention and in a ceiling mounted position.

FIG. 1 shows a product moving system generally indicated at 1. This product moving system comprises a guide track 3 in a ceiling mounted position interiorly of a building. A carrier member 5 is supported by the guide track 3.

Figure 2:
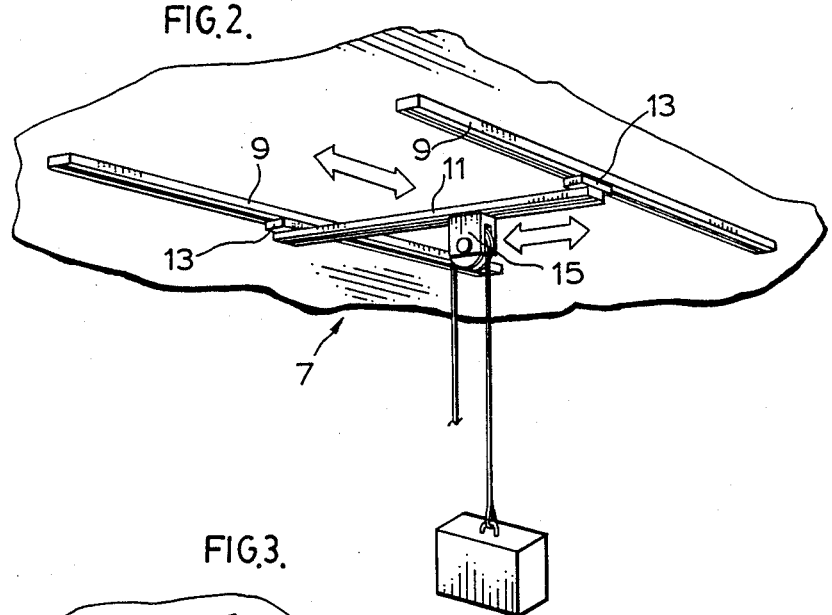
FIG. 2 shows a modification to the ceiling mounted system of FIG. 1.

FIG. 2 shows a somewhat modified product moving system 7. This system includes a pair of ceiling mounted guide tracks 9 and a transverse guide track 11. Carrier members 13 are supported by guide tracks 9 and these carrier members in turn support guide track 11. Guide track 11 supports a carrier member 15.

In the operation of system 7, guide track 11 through carriers 13 is movable longitudinally of guide tracks 9. Carrier member 15 is movable longitudinally of guide track 11 and therefore, through the different guide tracks and carriers as set up can be moved in the different directions shown by the arrows in FIG. 2.

Figure 3:
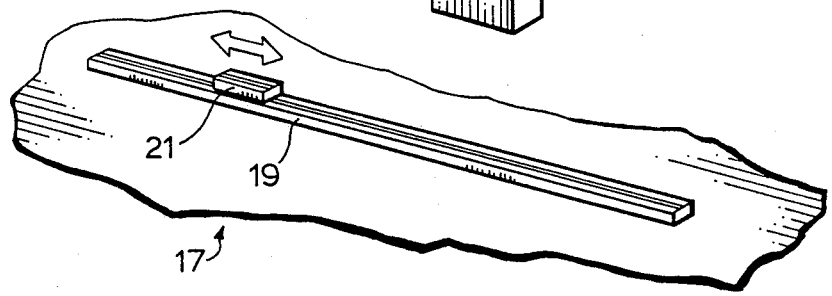
FIG. 3 is a perspective view of a floor mounted product moving system according to a further preferred embodiment of the present invention.

FIG. 3 shows a product moving system 17 comprising a guide track 19 and a carrier member 21. In this particular set up, guide track 19 is in a floor supported position rather than a ceiling mounted position as shown in FIGS. 1 and 2. However, it is to be noted that guide track 19 is for example identical to guide track 9 and carrier 21 is identical to carrier 13 so that the same guide track and carrier member can be used in either the ceiling mounted or floor supported position.

Figure 4:
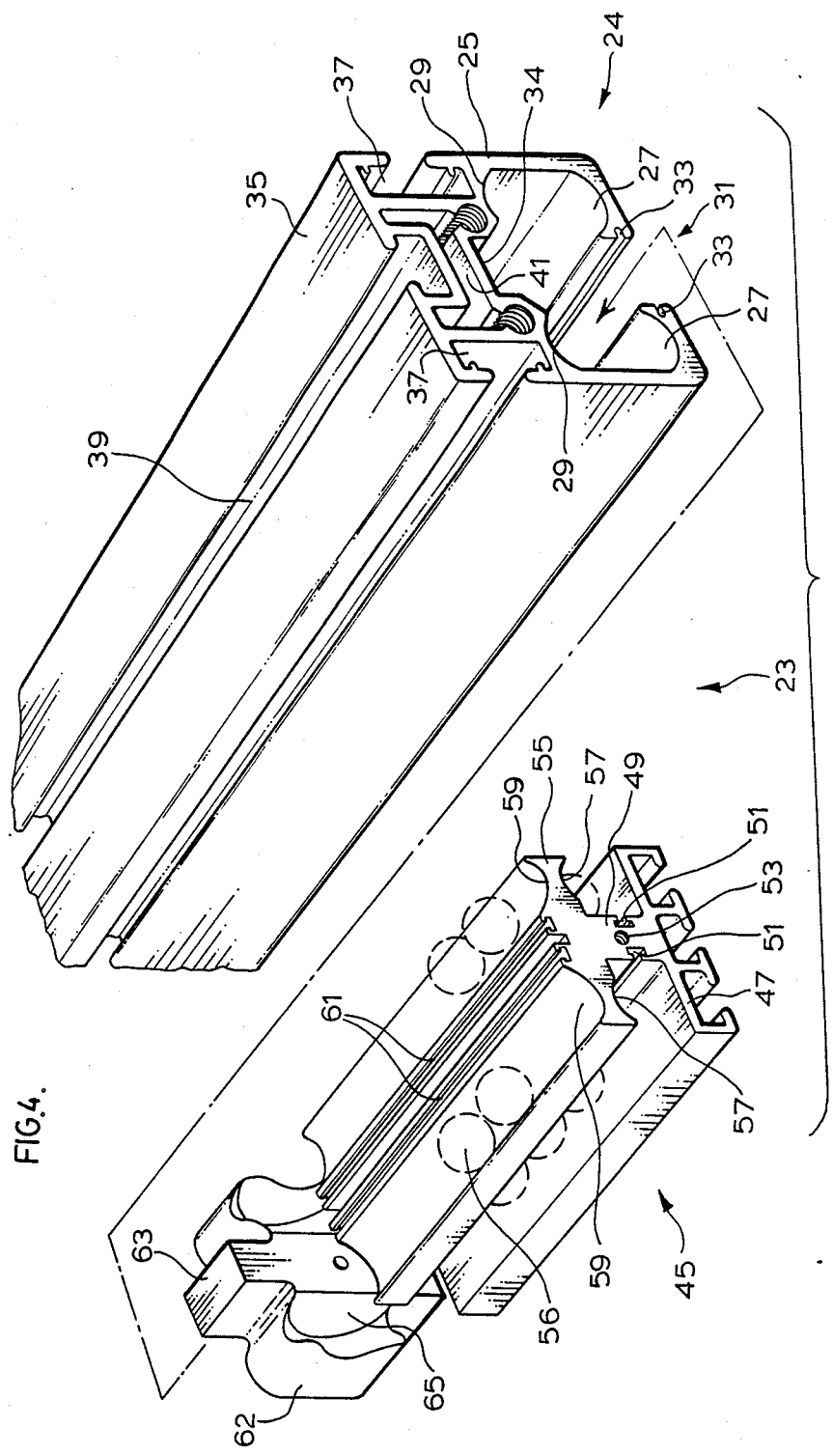
FIG. 4 is an exploded perspective view of a section of the guide track and the carrier member while riding in that guide track according to any one of the embodiments of FIGS. 1 through 3.

The details of the guide track and the carrier member are best seen having reference to FIG. 4 showing a product system generally indicated at 23. The guide track is generally indicated at 24 and the carrier member is generally indicated at 45.

Guide track 24 includes a carrier member supporting portion 25 and a mounting portion 35. As will be appreciated in comparing FIGS. 2 and 3, mounting portion 35 can be used in either a upside down hanging mode as shown in FIG. 4 or reversed from the FIG. 4 position where portion 35 forms a base support for the guide track. To this end guide track portion 35 is provided with a pair of outside undercut portions 37 and a central undercut portion 39 for fitting to mounting bolts or the like for supporting the guide track.

The carrier member receiving portion 25 of the guide track is provided with opposing arcuate and vertically aligned regions 27 and 29 to either side of the guide track. An undercut opening 31 is provided between the two arcuate regions 27. Located immediately above opening 31 is a recessed region 34 between the two arcuate regions 29.

Carrier 45 comprises first and second body portions 47 and 55 respectively. Body portion 45 is provided with back to back arcuate regions 57 and 59 to either side of the carrier.

The two body portions 47 and 55 are connected by a stem-like connector 49 having a threaded opening 53. The threaded opening is for the fitting of an end cap 62 as shown to the left hand side of the carrier in FIG. 4.

One of the features that will be clearly apparent from FIG. 4 of the drawings is the relatively simple construction of the carrier and track. The bulk of the carrier, i.e. carrier portion 55, fits internally of the track while only carrier portion 47 extends to one side of the track. Note that carrier portion 47 is no wider than the width of the track so that there is no overhang of the carrier relative to the track. This is important when considering that the track may be fitted in a relatively tight location still allowing clearance of the carrier as it moves down along the track, i.e. no added clearance is required to either side of the track for the movement of the carrier unlike prior art systems.

The movement of the carrier relative to the fixed guide track is best seen having reference to FIGS. 5 and 6 of the drawings. As clearly shown, the carrier moves through the use of recirculating balls 56 with a set of these balls being provided to each side of the system. FIG. 7 shows system 24 arranged in a ceiling mounted hanging mode whereas FIG. 8 of the drawings shows system 24 set up in a floor supported mode where the weight bears down rather than hanging from the carrier. In both cases, the weight is transferred vertically through the system by balls 56 which as noted above recirculate within the carrier.

The actual ball race construction is a key feature according to the present invention. The description of the ball race is best seen having reference to FIG. 4 once again. In particular, the ball races are defined by arcuate or race portions 27 and 29 on the guide member and the back to back arcuate or race portions 57 and 59 on the carrier member. Cap 62 at each end of the carrier member defines the end of each race.

Figure 9:
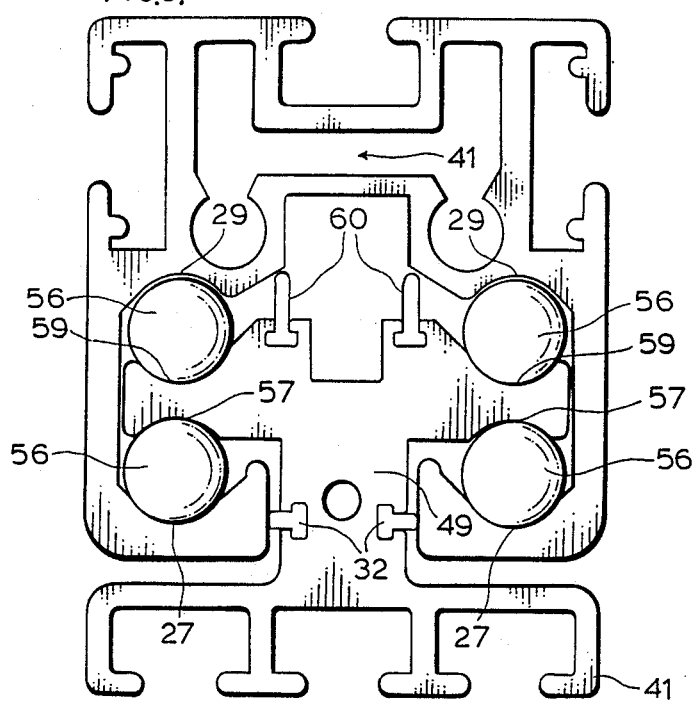
FIG. 9 is an end view of the carrier member of FIG. 4 when assembled excluding the end cap.

When the carrier is inserted in the guide track, stem portion 49 of the carrier fits through the undercut opening 31 of the guide track. Carrier portion 47 hangs to the bottom of the guide track while carrier portion 55 is totally encapsulated or enclosed within the guide track. This assembly is best seen having reference to FIG. 9 of the drawings. FIG. 9 further shows that the ball races to either side of the system are formed by the cooperation of the race portions on both the track and the carrier, i.e. the interior race portion is provided on the carrier while the exterior race portion is provided on the track. Furthermore, all of the race portions to each side of the track are in vertical alignment with one another to maximize the system's load bearing ability without causing any separation effect between the carrier and the track as to be contrasted for example to a systems where the balls recirculate in a side to side fashion rather than an up/down fashion as found in the present invention.

To assist the smooth riding of the carrier relative to the track, stem portion 49 provides a guide along the undercut opening 31 while the top projection 63 on the two end caps 62 ride smoothly within the channel-like region 34 of the guide track. A further feature of the present invention is seen having reference to both FIGS. 4 and 9 of the drawings. Provided to either side of undercut opening 31 are a pair of small slots 33 on the guide track and the stem portion 49 of the carrier includes small undercut openings 51. Provided on the top of the carrier are a second pair of small undercut openings 61. These two sets of openings are fitted with preferably rubber sound insulators 32 and 60 respectively. The outer ends of insulators 32 ride in the slots 33 while the outer ends of insulators 60 ride directly on the guide track itself as seen in FIG. 9 of the drawings. Therefore, as the carrier rides along the guide track, the noise created by the action of the recirculating balls is effectively trapped within the guide track and not allowed to escape beyond the carrier by the sound insulators.

In an alternate set up a continuous band like construction is provided which fits to both ends of the carrier through slot 41 in the guide track. This band encloses the part of the carrier in which the balls are fitted while permitting carrier movement as the band slides through the guide track. Once again in this arrangement, all of the noise created by the recirculating balls is effectively trapped within the guide by the sound insulator.

Again referring to FIG. 9 of the drawings, one very important advantage that is achieved by providing cooperative race portions on the carrier and the track is that neither component is provided with a through passage which is totally enclosed, i.e. in the arrangement shown in FIG. 9, there is nothing in the way of a complete tunnel through which the balls must pass and which is totally inaccessible in the event of ball jambing. In contrast, only half of each race portion is provided on each of the carrier and track members.

Figure 10:
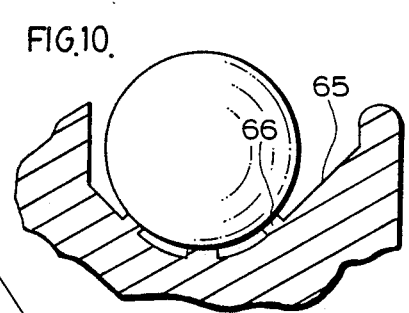
FIG. 10 is a top view looking down through the end of one of the ball races of the carrier member of FIG. 9.
Figure 11:
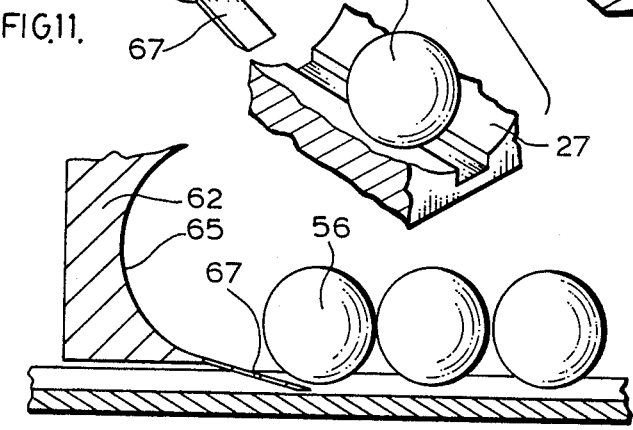
FIG. 11 is an exploded perspective view showing the ramp from the vertical to the horizontal portion of a ball race according to a preferred embodiment of the present invention.
Figure 12:
FIG. 12 is a sectional view from the side of the ball race of FIG. 11 when assembled.

It is important during the recirculating of the balls that they easily move around the ends of the carrier member. For this reason each of the end caps 62 has an interior arcuate or rounded surface 65. That rounded surface is in turn provided with a plurality of ribs 66 as shown in FIG. 10 of the drawings. This minimizes the contact area between the balls and the end cap for reducing rolling friction of the balls. Furthermore, arcuate surface 65 terminates at both ends in a ramp 67 which meet at an angle with the race portions. These ramps provide for a smooth transition of the balls into and out of the end caps.

Figure 13:
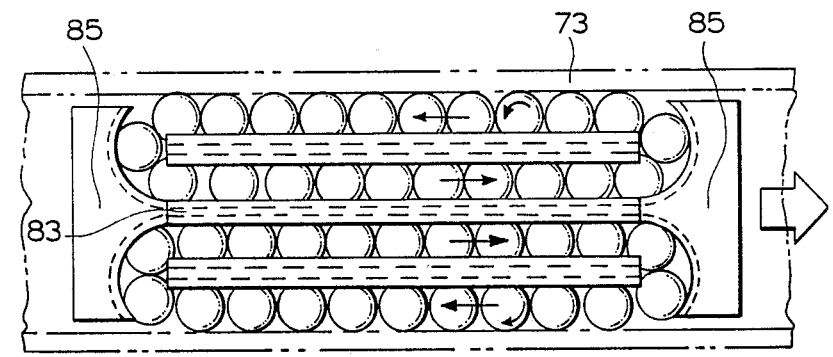
FIG. 13 is a sectional view through a carrier member incorporating a double ball race to either side of the carrier member.
Figure 14:
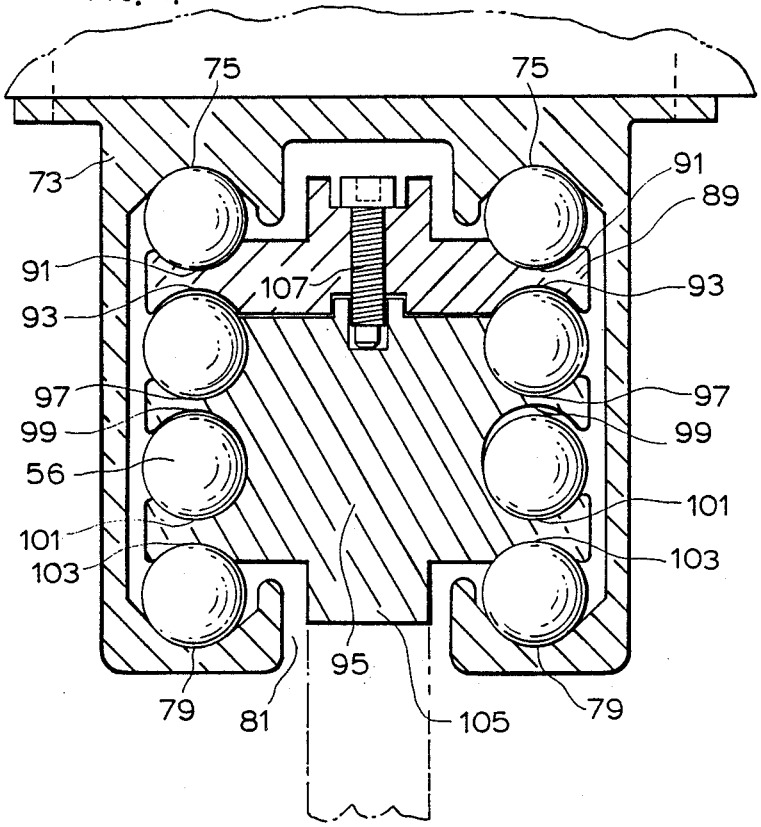
FIG. 14 is a sectional view looking lengthwise along the carrier member of FIG. 9.

The description above relates to a system including a single set of recirculating balls to each side of the system. FIGS. 13 and 14 of the drawings show a modified system 71 including a double set of recirculating balls to each side of the system. More particularly, system 71 includes a guide track 73 and a carrier member 83. Consistent with the earlier embodiments, the bulk of the carrier member is fitted internally of the guide track which once again determines maximum width of the system.

Guide track 73 is provided with a pair of race portions 75 and 79 to each side of the guide track. The guide track further includes a undercut opening 81 to accomodate the fitting of carrier portion 105 extending out through the guide track.

The carrier further includes two additional body portions namely body portions 89 and 95 trapped within the guide track. Carrier portion 89 includes a pair of back to back arcuate ball race portions 91 and 93. Note that race portion 91 on the carrier cooperates with race portion 75 on the track to form a complete ball race.

The other body portion 95 of the carrier is provided with arcuate back to back race portions 97 and 99 as well as further arcuate back to back race portions 101 and 103. Again, note that race portion 103 of the carrier cooperates with race portion 79 on the guide track to form a complete ball race. Another of the ball races is provided by the cooperative effect between race portions 93 and 97 while the final ball race is defined by race portions 99 and 101.

All of the above provides two separate and distinct vertically aligned ball races to either side of the carrier in which recirculating balls 56 are trapped. The actual recirculation of the balls, i.e. how they move around the raceways is seen in FIG. 13 of the drawings.

Again, consistent with the earlier embodiment all of the recirculating balls line up vertically with one another maximizing load bearing capacity of the system.

A very unique feature of system 71 is the ability to adjust the relative heights or separation of body portions 89 and 95 of the carrier by means of screw adjustment 107. This in turn adjusts the size of the raceway defined by race portions 75 and 91 to maximize performance of the system, i.e. this raceway should be set at the smallest possible tolerance relative to balls 56 without preventing jambing of the balls while ensuring a smooth movement with minimal noise and vibration in the tight tolerance raceway.

In FIG. 14, the system is shown in the hanging mode. If the system is inverted, adjustment 107 can be used to adjust the tolerance of the raceway defined by race portions 79 and 103 to again maximize performance with minimal vibration and noise from the system.

It will now be seen from the description above how a carrier system is built in accordance with the present invention with enhanced load bearing capacity using an extremely simple yet efficient vertical ball alignment design. Furthermore, because the carrier is substantially enclosed by the track the room required for set up of the system is no greater than the width of the track making it particularly appealing for areas of relatively tight space restraints.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A product moving system comprising a guide member and a carrier member movable along said guide member, said system including a ball race to either side thereof, each said ball race being fitted with rolling balls which recirculate through said ball race as said carrier member moves along said guide member, each said ball race being formed by cooperative race portions of said guide member and said carrier member, said cooperative race portions comprising a pair of back to back first race portions on said carrier member and a pair of second race portions on said guide member and facing said first race portions, the first and second race portions on each side of said system being vertically aligned with one another.

2. A product moving system as claimed in claim 1, wherein said carrier member includes a first body portion provided with said inner race portions and a second body portion provided with product carrying means, said first body portion being located interiorly of said guide member and said second body portion extending outwardly of and through an undercut opening on said guide member.

3. A product moving system as claimed in claim 2, including a pair of ball races to either side of said system, said pair of ball races being vertically aligned with one another.

4. A product moving system as claimed in claim 3, including adjustment means between said carrier member and said guide member, said adjustment means adjusting tolerance of all of said ball races relative to the rolling balls fitted therein.

5. A product moving system as claimed in claim 2, including sound dampening means cooperating between said carrier member and said guide member.

6. A product moving system as claimed in claim 5, wherein said sound dampening means isolates said first body portion of said carrier member interiorly of said guide member.

* * * * *